(12) United States Patent
Gallagher et al.

(10) Patent No.: US 6,362,419 B1
(45) Date of Patent: Mar. 26, 2002

(54) PEDESTAL STRUCTURE FOR HOUSING ELECTRICAL POWER CONNECTIONS AND OTHER EQUIPMENT

(75) Inventors: Bonnie C. Gallagher, Holliston, MA (US); Steven G. Cherry, Collegeville, PA (US); Charles Edward McMurray, Conneaut, OH (US)

(73) Assignee: Utility Marketing Corporation, Waltham, MA (US)

( * ) Notice: Subject to any disclaimer, the term of this patent is extended or adjusted under 35 U.S.C. 154(b) by 0 days.

(21) Appl. No.: 09/323,716

(22) Filed: Jun. 1, 1999

(51) Int. Cl.[7] .................................................. H02G 9/00
(52) U.S. Cl. ......................................... 174/37; 220/484
(58) Field of Search ............................. 174/37, 48, 50; 220/484

(56) References Cited

U.S. PATENT DOCUMENTS 3,868,040 A * 2/1975 Langmack et al. ........... 220/18
4,158,102 A * 6/1979 Bright ....................... 174/52 R
4,365,108 A * 12/1982 Bright ......................... 174/50

* cited by examiner

Primary Examiner—Peter S. Wong
Assistant Examiner—Gary L. Laxton
(74) Attorney, Agent, or Firm—Landiorio & Teska

(57) ABSTRACT

A pedestal structure includes a base and a cover; a tongue on one side of one of the base and cover and a groove in the corresponding side of the other for receiving the tongue when the base and cover are engaged; and a security mechanism having a first portion on an opposing side of one of the base and cover and a second portion on a corresponding opposing side of the other for securing together the base and cover and tightly engaging the tongue and groove.

15 Claims, 3 Drawing Sheets

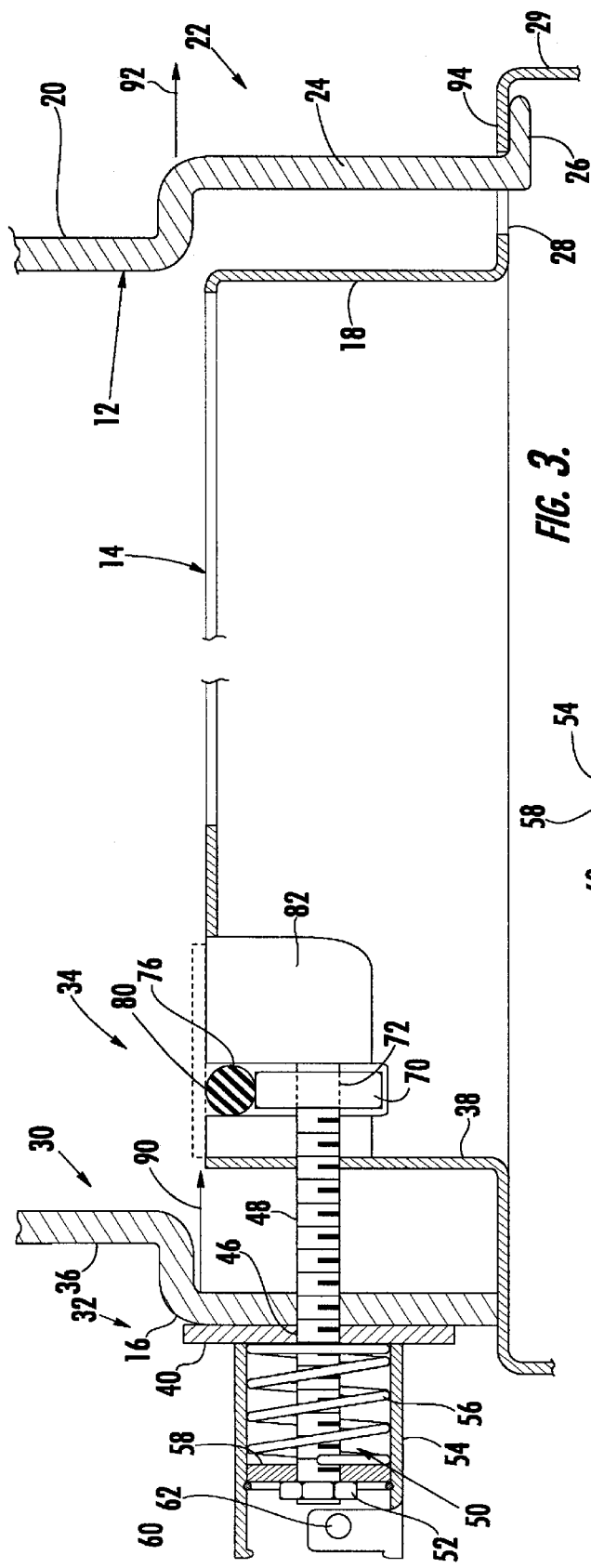
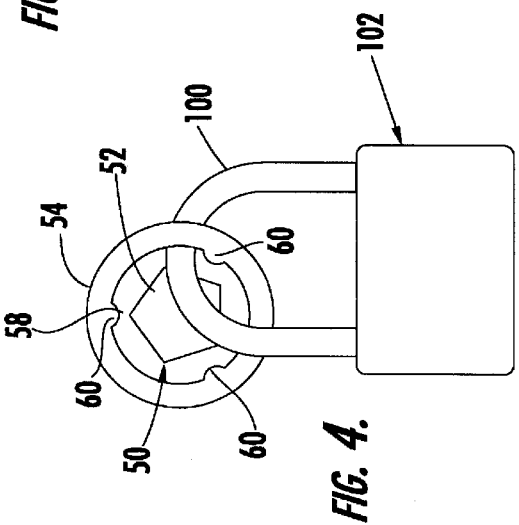
FIG. 3.
FIG. 4.

PEDESTAL STRUCTURE FOR HOUSING ELECTRICAL POWER CONNECTIONS AND OTHER EQUIPMENT

FIELD OF INVENTION

This invention relates to an improved pedestal structure, and more particularly to such a pedestal structure for housing electrical power connections and other equipment.

BACKGROUND OF INVENTION

Pedestal structures such as used for electrical power connections typically employ a base installed on or in the ground and a cover. The connections are made in the top half of the pedestal. The pedestal is meant to protect the equipment and provide for the safety of those in the area. To this end the pedestal must be sturdy, and have insulative properties. In addition it must be free from tampering or opening by unauthorized personnel. At the high voltages often present any wire or conductor penetrating the pedestal through gaps or opening could conduct hazardous electric currents and voltages to outside the pedestal. Failures or defects of the equipment inside the pedestal could also apply voltages and currents to conductive parts which are accessible externally. Separately, the covers, which are large and heavy, must be removed periodically to access the equipment. Presently, in one type of pedestal the securing mechanism is cumbersome and the cover must be tilted for removal which introduces the potential for the cover and/or the personnel to contact energized conductors and components.

BRIEF SUMMARY OF THE INVENTION

It is therefore an object of this invention to provide an improved pedestal structure for housing equipment.

It is a further object of this invention to provide such an improved pedestal structure suited for housing electrical power transformers and other electrical equipment.

It is a further object of this invention to provide such an improved pedestal structure which is sturdy and provides protection against electric shock.

It is a further object of this invention to provide such an improved pedestal structure which provides a simple, tight engagement between cover and base.

It is a further object of this invention to provide such an improved pedestal structure which prevents unauthorized tampering or insertion of foreign objects between the cover and base.

It is a further object of this invention to provide such an improved pedestal structure which prevents failures or defects of the equipment from transmitting hazardous voltage and current to the outside of the pedestal.

It is a further object of this invention to provide such an improved pedestal structure which discourages and prevents attempts to disengage the base and cover by unauthorized personnel.

It is a further object of this invention to provide such an improved pedestal structure in which disengagement of the cover and base by authorized personnel is simple and easy.

It is a further object of this invention to provide such an improved pedestal structure which uses few, simple and inexpensive parts to secure the pedestal base and cover against tampering and penetration and yet facilitates their easy and swift authorized disengagement.

The invention results from the realization that a truly simple, safe yet effective pedestal structure can be achieved using a tongue and groove arrangement on the base and cover on one side of the pedestal and a securing mechanism on an opposing side of the base and cover to secure the base and cover tightly together.

This invention features a pedestal structure including a base and a cover. There is a tongue on one side of one of the base and cover and a groove in the corresponding side of the other for receiving the tongue when the base and cover are engaged. A security mechanism has a first portion on an opposing side of one of the base and cover and a second portion on a corresponding opposing side of the other for securing together the base and cover and tightly engaging the tongue and groove.

In a preferred embodiment the tongue may be on the cover and the groove may be on the base. The first portion may include a male threaded member and the second portion may include a female threaded member. The first portion may include a housing for the male threaded member. The securing mechanism may include a biasing device for urging the portions apart. The biasing device may be in the first portion and it may be in the housing. The housing may include a retainer for constraining the biasing device. The male threaded member may have a pentagonal head. The housing may include a locking mechanism for blocking access to the male threaded member. The securing mechanism may include a biasing device for urging the portions apart. At least one of the base and cover may include a baffle for preventing insertion of a foreign object between them. The second portion may include a recess for enabling the female threaded member to adjust for misalignments of the male threaded member. The second threaded portion may include a keeper for retaining female threaded member in the recess. The second portion may include a shield around at least a portion of the male and female threaded members when they are engaged.

BRIEF DESCRIPTION OF THE DRAWINGS

Other objects, features and advantages will occur to those skilled in the art from the following description of a preferred embodiment and the accompanying drawings, in which:

FIG. 3 is a side sectional view of a portion of the base and cover with portions broken away to show the secure engagement of the cover with the base and the tight engagement of the tongue and groove when the securing mechanism has been operated; and FIG. 4 is a front elevational view showing just the housing portion of the securing mechanism with a guard lock in place.

Figure 1:
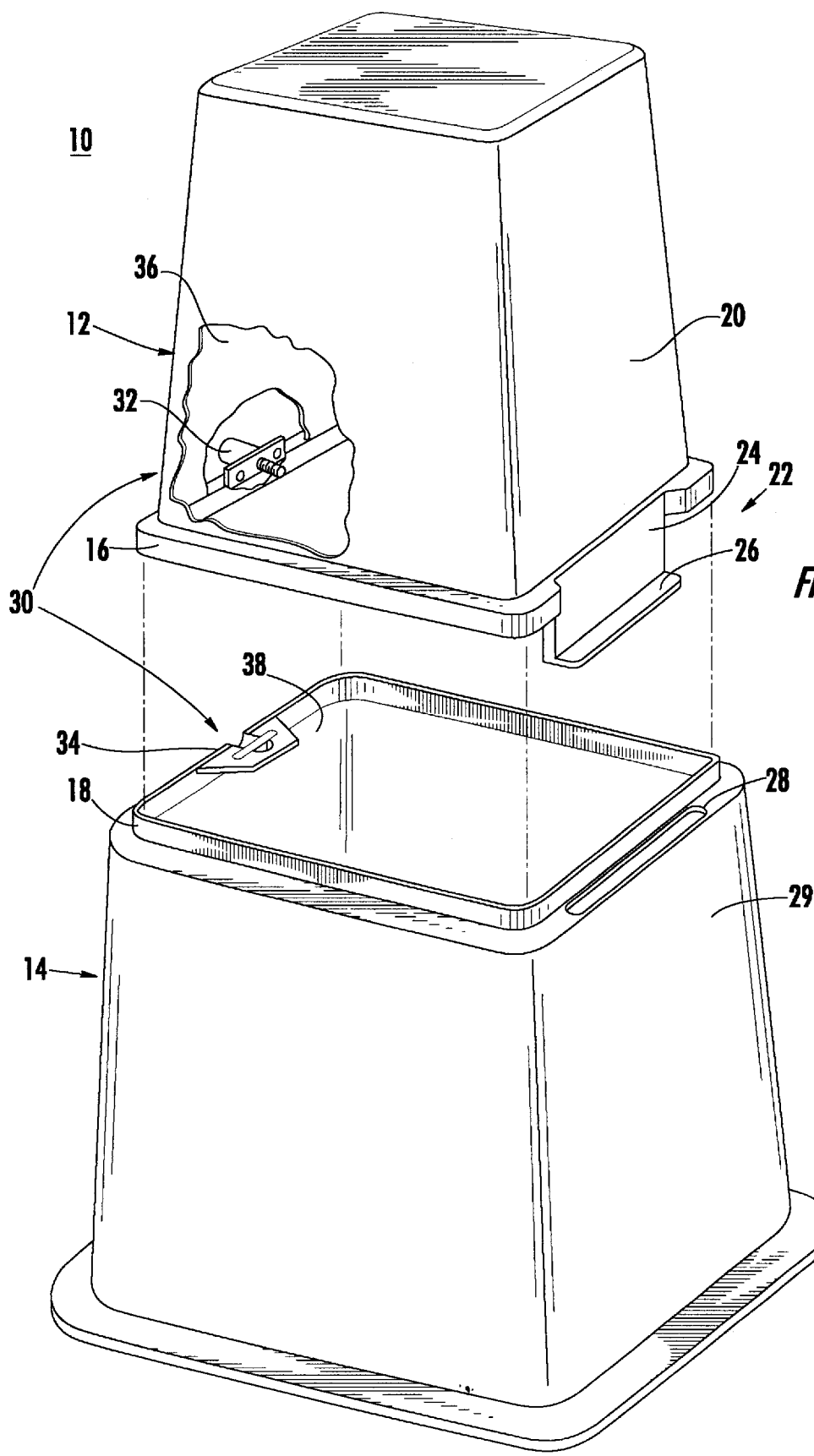
FIG. 1 is an exploded three-dimensional view with parts broken away of a pedestal structure according to this invention with the cover separated above the base.

There is shown in FIG. 1 a pedestal structure 10 according to this invention including a cover 12 and base 14. Cover 12 includes an overhanging lip 16 which accommodates upstanding baffle 18 on base 14 to prevent the insertion of objects from the outside in or from the inside out which could convey hazardous electrical energy. On one side 20 of cover 12 there is a tongue 22 formed of a vertical section 24 and a horizontal section 26 which is sized to pass through groove 28 on side 29 of base 14 when cover 12 is in position engaged with base 14. A securing mechanism 30 includes a securing portion 32 on cover 12 and a second securing portion 34 on base 14. Secured portions 32 and 34 are on corresponding sides 36 and 38 of cover 12 and base 14 across from opposing sides 20 and 29. The securing mechanism and the tongue and groove arrangement should be on opposing sides of the structure. They don't have to be exactly diametrically opposed, but whether the structure is circular, polygonal, square or rectangular as shown, or any other form, they should be in opposing relationship so that some component of the force applied by securing mechanism 30 is applied to tightly engage tongue 32 with groove 28.

Figure 2:
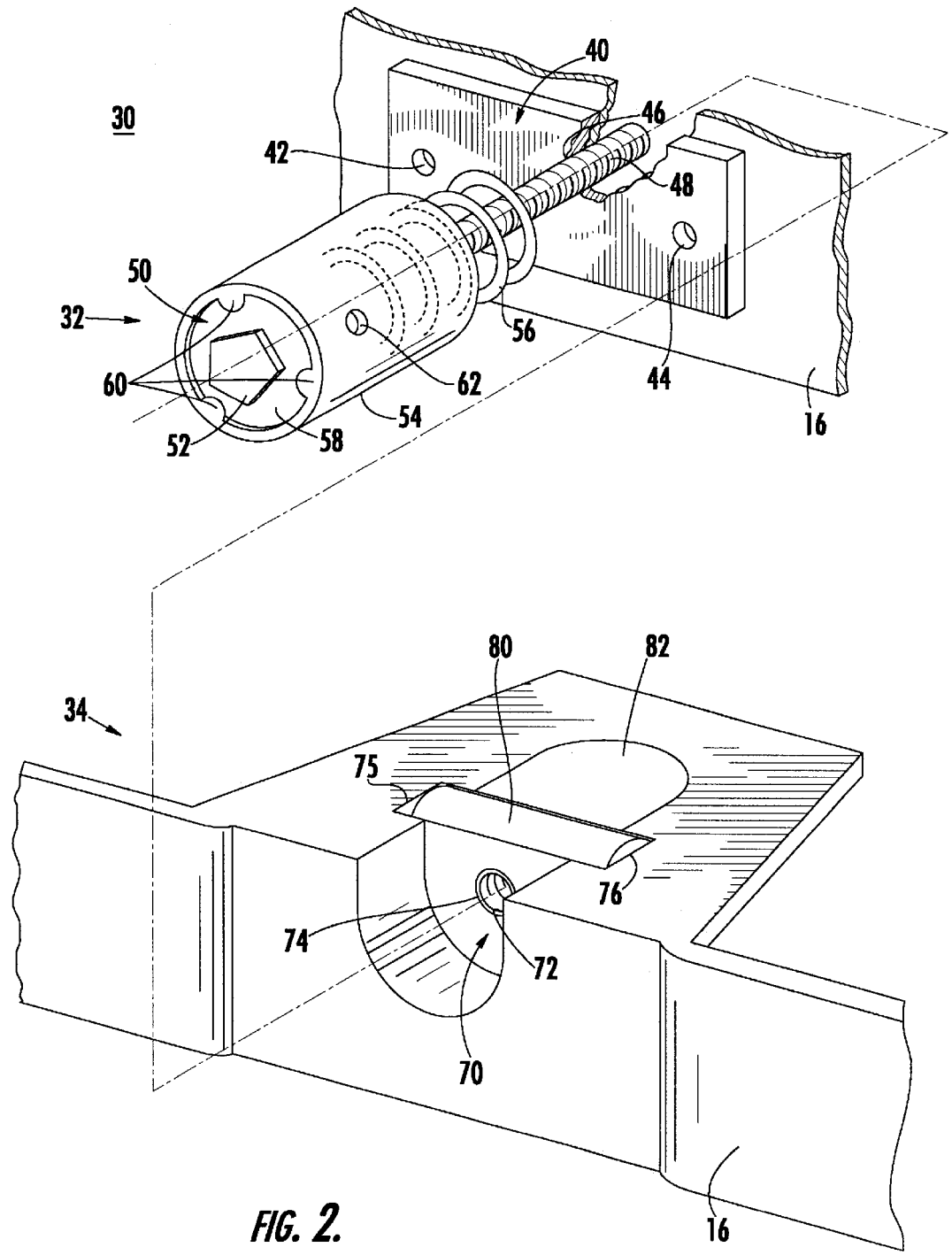
FIG. 2 is an exploded three-dimensional view with parts broken away of the two cooperating portions of the securing mechanism used in the pedestal of FIG. 1.

Securing mechanism 30 is shown in greater detail in FIG. 2. Securing portion 32 includes a mounting plate 40 which is mounted to side 36 of cover 12 by means of epoxy adhesive or bolts, not shown, through holes 42 and 44. A clearance hole 46 is provided to receive the threaded shaft 48 of bolt 50 which has a pentagonal shaped head 52 conforming to pentagonal wrenches used in the electrical power industry. Bolt 50 is surrounded by cylindrical housing 54 which is typically welded to plate 40 although in FIG. 2 it is shown exploded away from it for purposes of illustration. Inside of housing 54 is a biasing device, spring 56, which seats on plate 40 and exerts a force on the head 52 of bolt 50 through retaining washer 58 which is retained by means of detents 60 which, for example, may be simply spot welds that overlap the wall of cylindrical housing 54.

A hole 62 is provided to receive the hasp of a lock so that when bolt 50 is tightened and head 52 is driven into cylindrical housing 54, the hasp will block the front face of head 52 so that it cannot be easily removed. This is shown in more detail in FIGS. 3 and 4.

Portion 32 of securing mechanism 40 includes a nut 70, FIGS. 2 and 3, having an internally threaded bore 72 with a beveled entrance 74, FIG. 2, to assist in centering bolt 50. To further assist the centering of bolt 50 and accommodate for tolerable misalignments, slots 75, 76 is provided wherein nut 70 can move up and down and slightly sideways. A non-conductive retaining dowel, e.g., nylon dowel 80, is force-fitted in the top of slots 75 and 76 to keep nut 70 in the slot. A shield is formed by well 82 to at least partially shield mechanically and electrically nut 70 and bolt 50 when they are engaged and bolt extends through nut 70 into well 82.

In operation, cover 12, FIG. 3, is brought straight down without tilting onto base 14. The threaded portion 48 of bolt 50 is centered in threaded hole 72 of nut 70 which is free to float to a limited degree in slots 75 and 76. As the head 52 of bolt 50 is turned against the bias of spring 56 using a pentagonal wrench, for example, spring 56 exerts a force against plate 40 which drives the cover to the right as shown by arrows 90, 92. This securely tucks horizontal section 26 of tongue 22 under the lip 94 of groove 28 and urges vertical section 24 of tongue 22 against the edge of groove 28 at lip 94, making for a tight penetration-proof joint. With bolt 50 screwed in as shown, hole 62 is clear for acceptance of the hasp 100, FIG. 4, of lock 102 fs that the hasp blocks the face or the head 52 of bolt 50 so that it cannot be easily accessed by a wrench or other means to loosen it.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A pedestal structure comprising:

a base and a cover;

a tongue on one side of one of said base and cover and groove in the corresponding side of the other for receiving said tongue when said base and cover are engaged; and a securing mechanism having a first portion on an opposing side of one of said base and cover and a second portion on a corresponding opposing side of the other for securing together said base and cover and tightly engaging said tongue and groove.

2. The pedestal structure of claim 1 in which said tongue is on the cover and said groove is on the base.

3. The pedestal structure of claim 1 in which said first portion includes a male threaded member and said second portion includes a female threaded member.

4. The pedestal structure of claim 3 in which said first portion includes a housing for said male threaded member.

5. The pedestal structure of claim 4 in which said securing mechanism includes a biasing device for urging said portions apart.

6. The pedestal structure of claim 5 in which said biasing device is in said first portion.

7. The pedestal structure of claim 6 in which said biasing device is in said housing.

8. The pedestal structure of claim 7 in which said housing includes a retainer for constraining said biasing device.

9. The pedestal structure of claim 3 in which said male threaded member has a pentagonal head.

10. The pedestal structure of claim 4 in which said structure includes a locking mechanism for blocking access to said male threshold member.

11. The pedestal structure of claim 3 in which said securing mechanism includes a biasing device for urging said portions apart.

12. The pedestal structure of claim 1 in which at least one of said base and cover includes a baffle for preventing insertion of a foreign object between them.

13. The pedestal structure of claim 3 in which said second portion includes a recess for enabling said female threaded member to adjust for misalignments of said male threaded member.

14. The pedestal structure of claim 13 in which said second portion includes a keeper for retaining said female threaded member in said recess.

15. The pedestal structure of claim 3 in which said second portion includes a shield around at least a portion of said male and female threaded members when they are engaged.

* * * * *